US012694653B2

(12) United States Patent
Kothari et al.

(10) Patent No.: US 12,694,653 B2
(45) Date of Patent: Jul. 28, 2026

(54) NEURAL NETWORK

(71) Applicant: Ford Global Technologies, LLC, Dearborn, MI (US)

(72) Inventors: Parul Kothari, New Brunswick, NJ (US); Iurii Simanovskyi, Valencia, PA (US); Michael Joseph Rondinelli, Cranberry Township, PA (US); Richard Kwant, San Bruno, CA (US); Ian Volkwein, Pittsburgh, PA (US); Rose Ciriello, Pittsburgh, PA (US); Dave Chekan, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 278 days.

(21) Appl. No.: 18/660,302

(22) Filed: May 10, 2024

(65) Prior Publication Data

US 2025/0349109 A1 Nov. 13, 2025

(51) Int. Cl.
| | |
|---|---|
| *G06V 20/40* | (2022.01) |
| *G06V 10/774* | (2022.01) |
| *G06V 10/82* | (2022.01) |
| *G06V 10/94* | (2022.01) |

(52) U.S. Cl.
CPC ............ *G06V 10/774* (2022.01); *G06V 10/82* (2022.01); *G06V 10/945* (2022.01); *G06V 20/41* (2022.01); *G06V 20/46* (2022.01)

(58) Field of Classification Search
None
See application file for complete search history.

(56) References Cited

U.S. PATENT DOCUMENTS

| | | | |
|---|---|---|---|
| 10,872,269 | B2 | 12/2020 | Roy Chowdhury et al. |
| 11,164,001 | B2 | 11/2021 | Li et al. |
| 11,636,686 | B2 | 4/2023 | Westmacott et al. |
| 2021/0342589 | A1* | 11/2021 | Chawla ................. G06V 20/20 |

FOREIGN PATENT DOCUMENTS

| | | |
|---|---|---|
| CN | 113542868 A | 3/2022 |
| WO | 2020228296 A1 | 11/2020 |

OTHER PUBLICATIONS

"ASAM OpenLABEL®", https://www.asam.net/standards/detail/openlabel/, accessed Jan. 22, 2024.

* cited by examiner

*Primary Examiner* — Idowu O Osifade
(74) *Attorney, Agent, or Firm* — Frank A. MacKenzie; Brooks Kushman P.C.

(57) ABSTRACT

A computer that includes a processor and a memory, the memory including instructions executable by the processor to plot three-dimensional positions of labeled cuboids from successive frames between a first keyframe and a second keyframe of a densely labeled video sequence. A sparsely labeled video sequence can be generated by removing labeled cuboids from the densely labeled video sequence with positions that are within a user-selected distance from a line extending from a position of the labeled cuboid in the first keyframe to a position of the labeled cuboid in the second keyframe. The sparsely labeled video sequence can be output for training a machine learning system.

20 Claims, 9 Drawing Sheets

900

START

902    RECEIVE DENSELY LABELED VIDEO SEQUENCE

904    REDUCE LABELS IN VIDEO SEQUENCE

906    GENERATE TRAINING DATASET FROM SPARSELY LABELED VIDEO SEQUENCE

908    TRAIN MLM WITH TRAINING DATASET

910    TRANSER TRAINED MLM TO VEHICLE

END

NEURAL NETWORK

BACKGROUND

Computers can operate systems and devices including vehicles, robots, drones, and/or object tracking systems. Data including images can be acquired by sensors and processed by a computer to determine a location of a system with respect to an environment and with respect to objects in the environment. A computer may use the location data to determine one or more trajectories and/or actions for operating the system or components thereof in the environment.

DETAILED DESCRIPTION

Figure 1:
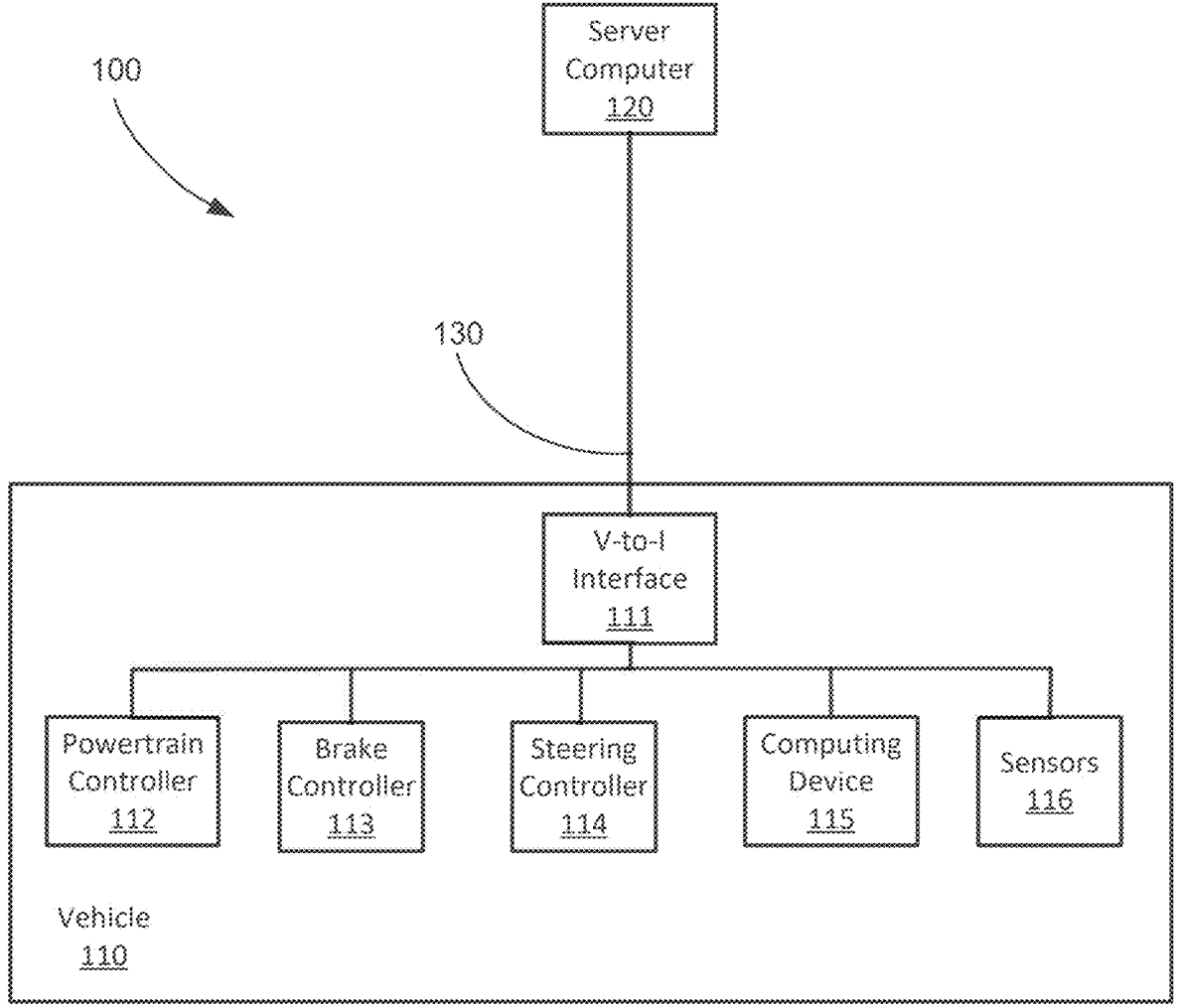
FIG. 1 is a block diagram of an example vehicle system.

Systems that move and/or that have mobile components, including vehicles, robots, drones, cell phones etc., can be operated by acquiring sensor data, including data regarding an environment around the system, and processing the sensor data to determine locations of objects in the environment around the system. The determined location data could be processed to determine operation of the system or portions of the system. For example, a robot could determine the location of another nearby robot's arm. The determined robot arm location could be used by the robot to determine a path upon which to move a gripper to grasp a workpiece without encountering the other robot's arm. In another example, a vehicle could determine a location of another vehicle traveling on a roadway. The vehicle could use the determined location of the other vehicle to determine a path upon which to operate while maintaining a predetermined distance from the other vehicle. Vehicle operation will be used herein as a non-limiting example of system location determination in description below.

A machine learning system, referred to herein as a machine learning model, can be trained to determine identities and locations of one or more objects included in the environment, for example roadways and vehicles. A machine learning model can include a convolutional neural network, for example. Convolutional neural networks can include convolutional layers and fully connected layers and can be trained to identify and locate objects. Training a convolutional neural network can require a training dataset that can include thousands of video sequences that can include millions of images. In addition, training a machine learning model such as a convolutional neural network can require ground truth data for the images in the training dataset. Ground truth includes annotation data regarding the identities and locations of objects included in the training dataset acquired from a source other than the machine learning model, for example user annotation of the images in the training dataset.

A trained machine learning model such as a convolutional neural network can be installed in a computing device in a vehicle to receive sensor data from sensors included in the vehicle. The machine learning model can determine predictions regarding the received sensor data to assist in operating the vehicle. For example, a trained convolutional neural network can be trained to receive images from video cameras and determine predictions regarding an environment around a vehicle. Predictions can include determining the location and motion of the vehicle with respect to the environment and location and motion of objects in the environment. These predictions can include determining three-dimensional (3D) spatial-color coordinate systems based on acquired two-dimensional (2D) images.

Obtaining predictions from a machine learning model that identify and locate objects in an environment around a vehicle can depend upon the quality and amount of training data in the training dataset used to train the machine learning model. A training dataset can include video sequences and accompanying ground truth data that identifies and locates objects in the video sequence. The quality of the training dataset refers to how similar the video sequences are to the types of video data that will be acquired by a vehicle while operating, including types of roadways such as highways, types of objects such as other vehicles, and environmental conditions such as lighting and weather.

Figure 2:
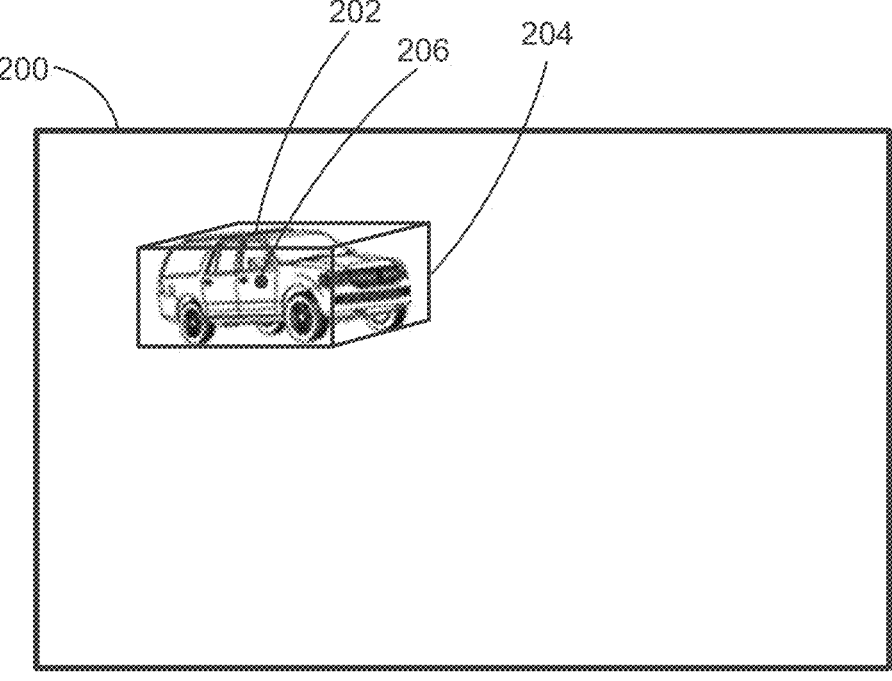
FIG. 2 is a diagram of an example image including labeled cuboid object.

Training a machine learning model can include a large amount of data. For example, training a machine learning model can include thousands of video sequences that include millions of images. Acquiring this many high quality video sequences with ground truth data can be accomplished by acquiring video sequences that have been processed with labeling software to include labels on objects of interest. For example, a labeled video sequence can include labeled cuboids (as illustrated in FIG. 2, discussed below) that locate and identify an object such as a vehicle in the video sequence. The object can be identified by the color of the labeled cuboid or by a text label applied to the video data attached to or near the labeled cuboid. The position of the labeled cuboid can be indicated by three-dimensional x, y, and z location coordinates and two-dimensional yaw rotational coordinates. The pitch and roll rotational coordinates of the object are assumed to be constant for training purposes. The location coordinates and rotational coordinates are in a global coordinate system.

Labeled video sequences that include labeled cuboids in most frames that include objects are referred to herein as densely labeled video sequences. Densely labeled video sequences can be generated by software programs that can be programmed to label video sequences without human intervention. Software tools that manage training datasets for training machine learning models are designed to work with sparely labeled video sequences and do not properly process densely labeled video sequences. A sparsely labeled video sequence can include a labeled object in a frame of video data, called a keyframe, and then further can include one or more frames of video data that include unlabeled objects, and then another keyframe with a labeled object, and so forth. The machine learning model training preparation programming expects that the location and orientation of the object will change linearly between keyframes, and that the identity of the objects will not change between keyframes. Densely labeled video sequences include too many object labels and makes processing the video sequence highly inefficient, using more computer resources to process densely labeled video sequences than sparsely labeled video sequences.

Techniques described herein can enhance processing of machine learning training datasets by converting densely labeled video sequences to sparsely labeled video sequences while maintaining linear change in positions and orientations of objects between keyframes. Converting densely labeled video sequences to sparsely labeled video sequences while maintaining linear change in positions and orientations of objects between keyframes can enhance training of machine learning models by reducing computing resources required to process the labeled video sequences for inclusion in training datasets.

Disclosed herein is a method including plotting three-dimensional positions of labeled cuboids from successive frames between a first keyframe and a second keyframe of a densely labeled video sequence and generating a sparsely labeled video sequence by removing the labeled cuboids from the densely labeled video sequence with positions that are within a user-selected distance from a three-dimensional line extending from a position of the labeled cuboid in the first keyframe to a position of the labeled cuboid in the second keyframe. The sparsely labeled video sequence can be output for training a machine learning system. Orientations of the labeled cuboids from the successive frames can be plotted between the first keyframe and the second keyframe of the densely labeled video sequence. The sparsely labeled video sequence can be generated by removing the labeled cuboids from the densely labeled video sequence with orientations that are within the user-selected distance from a line extending from the orientation of the labeled cuboid in the first keyframe to the orientation of the labeled cuboid in the second keyframe. The labeled cuboids can be three-sided wire frames that indicate objects. The labeled cuboids can include labels that identify the objects. The three-dimensional positions of the labeled cuboids can be x, y, and z global coordinates.

The labeled cuboids can be removed from the densely labeled video sequence by a Douglas-Peucker algorithm that removes the labeled cuboids by determining L2 distances between a three-dimensional polyline based on the positions of the labeled cuboids and the three-dimensional line extending from the position of the labeled cuboid in the first keyframe to the position of the labeled cuboid in the second keyframe. When the L2 distance exceeds a maximum allowable L2 distance, a new keyframe can be indicated in the video sequence. The labeled cuboids can be removed from the densely labeled video sequence by a Douglas-Peucker algorithm that removes the labeled cuboids by determining distances by linear interpolation in quaternion space between a polyline based on the orientations of the labeled cuboids and the line extending from the orientation of the labeled cuboid in the first keyframe to the orientation of the labeled cuboid in the second keyframe. When the distance exceeds a maximum allowable distance, a new keyframe can be indicated in the video sequence. The Douglas-Peucker algorithm can remove the labeled cuboids by determining distances between the polyline and the line extending from the orientation of the labeled cuboid in the first keyframe to the orientation of the labeled cuboid in the second keyframe based on L2 distances between Lie Algebra vectors for the line and the orientations of the labeled cuboids. The Douglas-Peucker algorithm can remove the labeled cuboids by determining L2 distances in rotation matrices between the line and the orientations of the labeled cuboids. The machine learning system can be a neural network. The machine learning system can be included in a vehicle. The vehicle can be operated based on the machine learning system.

Further disclosed is a computer readable medium, storing program instructions for executing some or all of the above method steps. Further disclosed is a computer programmed for executing some or all of the above method steps, including a computer apparatus, programmed to plot three-dimensional positions of labeled cuboids from successive frames between a first keyframe and a second keyframe of a densely labeled video sequence and generate a sparsely labeled video sequence by removing the labeled cuboids from the densely labeled video sequence with positions that are within a user-selected distance from a three-dimensional line extending from a position of the labeled cuboid in the first keyframe to a position of the labeled cuboid in the second keyframe. The sparsely labeled video sequence can be output for training a machine learning system. Orientations of the labeled cuboids from the successive frames can be plotted between the first keyframe and the second keyframe of the densely labeled video sequence. The sparsely labeled video sequence can be generated by removing the labeled cuboids from the densely labeled video sequence with orientations that are within the user-selected distance from a line extending from the orientation of the labeled cuboid in the first keyframe to the orientation of the labeled cuboid in the second keyframe. The labeled cuboids can be three-sided wire frames that indicate objects. The labeled cuboids can include labels that identify the objects. The three-dimensional positions of the labeled cuboids can be x, y, and z global coordinates.

The instructions can include further instructions to remove the labeled cuboids from the densely labeled video sequence by a Douglas-Peucker algorithm that removes the labeled cuboids by determining L2 distances between a three-dimensional polyline based on the positions of the labeled cuboids and the three-dimensional line extending from the position of the labeled cuboid in the first keyframe to the position of the labeled cuboid in the second keyframe. When the L2 distance exceeds a maximum allowable L2 distance, a new keyframe can be indicated in the video sequence. The labeled cuboids can be removed from the densely labeled video sequence by a Douglas-Peucker algorithm that removes the labeled cuboids by determining distances by linear interpolation in quaternion space between a polyline based on the orientations of the labeled cuboids and the line extending from the orientation of the labeled cuboid in the first keyframe to the orientation of the labeled cuboid in the second keyframe. When the distance exceeds a maximum allowable distance, a new keyframe can be indicated in the video sequence. The Douglas-Peucker algorithm can remove the labeled cuboids by determining distances between the polyline and the line extending from the orientation of the labeled cuboid in the first keyframe to the orientation of the labeled cuboid in the second keyframe based on L2 distances between Lie Algebra vectors for the line and the orientations of the labeled cuboids. The Douglas-Peucker algorithm can remove the labeled cuboids by determining L2 distances in rotation matrices between the line and the orientations of the labeled cuboids. The machine learning system can be a neural network. The machine learning system can be included in a vehicle. The vehicle can be operated based on the machine learning system. FIG. 1 is a diagram of a vehicle 110 computing system 100. Vehicle computing system 100 includes a vehicle 110, a computing device 115 included in the vehicle 110, and a server computer 120 remote from the vehicle 110. One or more vehicle 110 computing devices 115 can receive data regarding the operation of the vehicle 110 from sensors 116. The computing device 115 may operate vehicle 110 based on data received from the sensors 116 and data received from the remote server computer 120. The server computer 120 can communicate with the vehicle 110 via a network 130.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle propulsion (i.e., control of speed in the vehicle 110 by controlling one or more of an internal combustion engine, electric motor, hybrid engine, etc.), steering, climate control, interior and exterior lights, etc., as well as to determine whether and when the computing device 115, as opposed to a human operator, is to control such operations. The computing device 115 can also control the temporal alignment of lighting to sensor acquisition to account for the color effects of vehicle lights or external lights.

The computing device 115 may include or be communicatively coupled to, i.e., via a vehicle communications bus as described further below, more than one computing devices, i.e., controllers or the like included in the vehicle 110 for monitoring and controlling various vehicle components, i.e., a propulsion controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in vehicle 110 and receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2I) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and wireless networking technologies, i.e., cellular, BLUETOOTH®, Bluetooth Low Energy (BLE), Ultra-Wideband (UWB), Peer-to-Peer communication, UWB based Radar, IEEE 802.11, and other wired and wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2I) interface 111 to a server computer 120 or user mobile device 160.

As already mentioned, generally included in instructions stored in the memory and executable by the processor of the computing device 115 is programming for operating one or more vehicle 110 components, i.e., steering, propulsion, etc., without intervention of a human operator. Using data received in the computing device 115, i.e., the sensor data from the sensors 116, the server computer 120, etc., the computing device 115 may make various determinations and control various vehicle 110 components and operations. For example, the computing device 115 may include programming to control vehicle 110 operational behaviors (i.e., physical manifestations of vehicle 110 operation) such as speed, steering, etc., as well as tactical behaviors (i.e., control of operational behaviors typically in a manner intended to achieve efficient traversal of a route) such as a distance between vehicles and amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and control a specific vehicle subsystem. Examples include a propulsion controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the vehicle 110.

The one or more controllers 112, 113, 114 for the vehicle 110 may include known electronic control units (ECUs) or the like including, as non-limiting examples, one or more propulsion controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices such as are known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and other sensors 116 and the geographical coordinates provided by the GPS sensor may be used by the computing device 115 to operate the vehicle 110, for example.

The vehicle 110 is generally a land-based vehicle 110 having three or more wheels, i.e., a passenger car, light truck, etc. Vehicle 110 includes one or more sensors 116, the V2I interface 111, the computing device 115 and one or more controllers 112, 113, 114. Sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, oil pressure, the amount of power applied to controllers 112, 113, 114 in the vehicle 110, connectivity between components, and accurate and timely performance of components of the vehicle 110.

Server computer 120 typically has features in common, e.g., a computer processor and memory and configuration for communication via a network 130, with the vehicle 110 V2I interface 111 and computing device 115, and therefore these features will not be described further to reduce redundancy. A server computer 120 can be used to develop and train software that can be transmitted to a computing device 115 in a vehicle 110.

FIG. 2 is a diagram of an example video frame 200 from a labeled video sequence. Video frame 200 includes object 202, which in this example is a vehicle. Video frame 200 includes a labeled cuboid 204. Labeled cuboid 204 is a three-sided wire frame cube that includes horizontal, vertical, and oblique elements that form a three-dimensional rectangular solid that closely fits a three-dimensional model of the object 202. The labeled cuboid 204 is labeled to identify the object 202 that it encloses. The labeled cuboid 204 can be labeled by selecting a color for the wire frame cube, where the color indicates the identity of the object 202. For example, the labeled cuboid 204 can be colored red to indicate a vehicle. In examples of labeled cuboids 204 the label can be indicated by text in a box attached to the labeled cuboid 204.

Video frame 200 can also include center 206 of the labeled cuboid 204, indicated in video frame 200 by a dot. Center 206 can be used to track the position of the labeled cuboid 204 in a video sequence. The orientation of the labeled cuboid 204 and the object indicated by the labeled cuboid 204 can be determined by determining the angles that the horizontal, vertical and oblique elements of the labeled cuboid 204 make with respect to the rows and columns of pixels included in the video frame 200. The angles of the elements of the labeled cuboid 204 can be determined by image processing techniques; for example, a Hough transform can be used to determine angles of straight lines.

Figure 3:
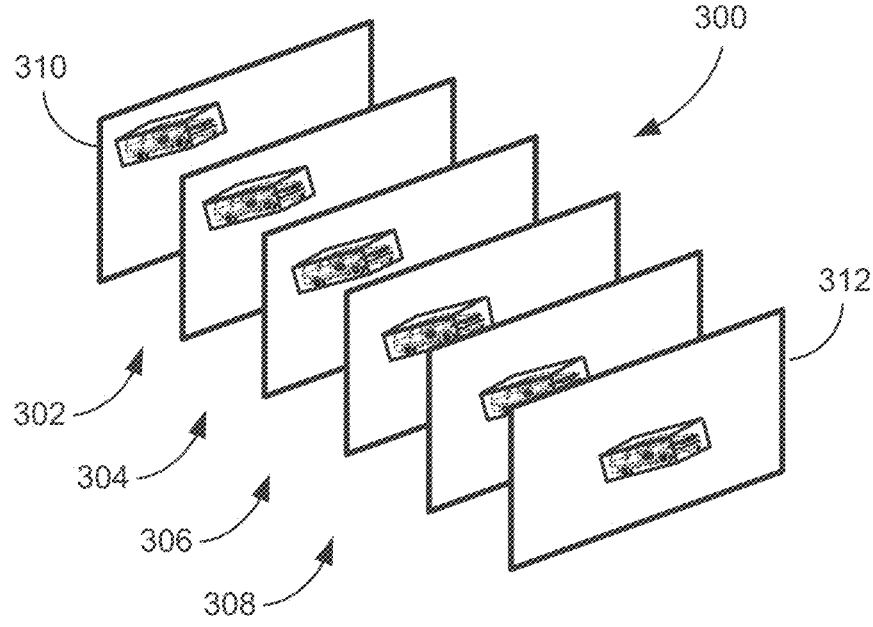
FIG. 3 is a diagram of an example densely labeled video sequence.

FIG. 3 is a diagram of an example densely labeled video sequence 300. Densely labeled video sequence 300 includes multiple video frames 302 that include objects 304, labeled cuboids 306 and centers 308. As discussed above, the labeled cuboids can be applied to the video frames in the acquired video sequence 300 by a labeling software, which can be a machine learning model. Densely labeled video sequence 300 can be acquired by a video camera acquiring video frames 302 at a selected frame rate, for example 60 frames per second (fps). Acquiring a densely labeled video sequence 300 with at a selected frame rate can generate video frames 302 that are separated by equal time steps, for example 16.67 milliseconds in the example of 60 fps frame rate. Acquiring a densely labeled video sequence 300 at known intervals can permit a machine learning model to determine object direction and velocity based on determining labeled cuboid 306 centers 308 over time, for example.

Densely labeled video sequence 300 referred to as a densely labeled video sequence 300 because the majority of video frames 302 include objects 304 with labeled cuboids 306 surrounding them. In this example all of the video frames 302 of densely labeled video sequence 300 between first keyframe 310 and second keyframe 312 include labeled cuboids 306 around objects 304. Keyframes 310, 312 can be selected based on a user-determined maximum number of frames, for example 10 frames, or based on detecting changes in the contents of the video frames 302. For example, if two adjacent frames 200 differ in pixel values determined by subtracting one frame 200 from the next frame 200 greater than a user-selected threshold, the scene include in the video sequence 300 has changed sufficiently that a keyframe should be selected at that point.

Figure 4:
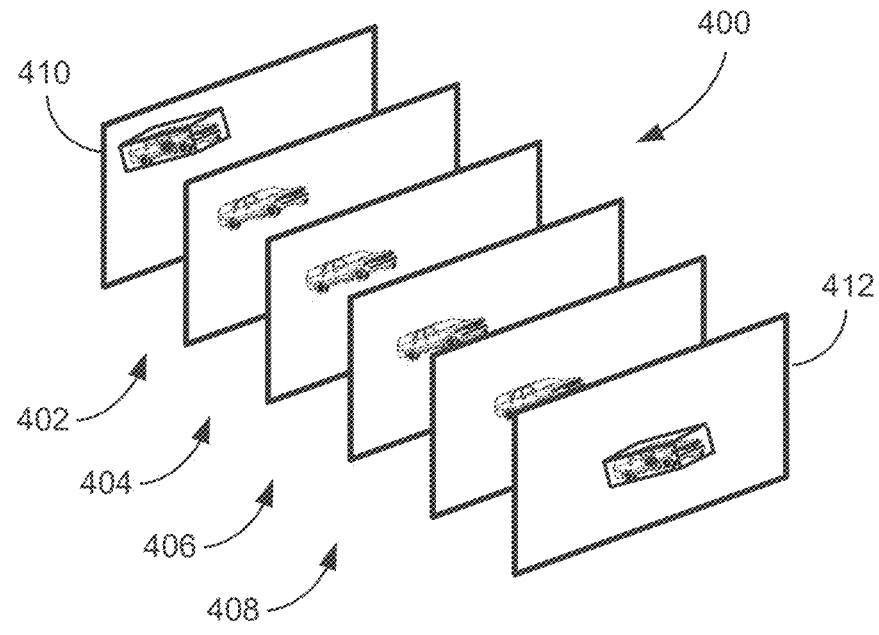
FIG. 4 is a diagram of an example sparsely labeled video sequence.

FIG. 4 is a diagram of an example sparsely labeled video sequence 400. Sparsely labeled video sequence 400 can be generated from densely labeled video sequence 300 using techniques described herein for converting densely labeled video sequences 300 to sparsely labeled video sequences 400. Keyframes 410, 412 include objects 404, labeled cuboids 406 and centers 408. Video frames 402 between keyframes 410, 412 include objects 404 with labeled cuboids 406 and centers 408 removed. To prepare video sequences for inclusion in training datasets for training machine learning models, the video sequences can be first labeled using labeled cuboids 406 and centers 408. In examples where the labeling is performed by software programs such as previously trained machine learning models, the output from the machine learning model can be densely labeled video sequences 300. A densely labeled video sequence 300 can be examined to verify that object 304 in the densely labeled video sequence 300 has been correctly labeled before using the labeled data to train a new machine learning model. Once a densely labeled video sequence 300 has been checked for accuracy, the densely labeled video sequence 300 can be input to a dataset preparation software program that determines the identity, position, and orientation of the objects 304 in each frame of the densely labeled video sequence 300 to store as the ground truth to accompany the video sequence. The data preparation software can remove labeled cuboids 306 and centers 308 from the labeled video frames to prepare the video sequence for input to a machine learning model for training. An unlabeled video sequence and corresponding ground truth data can be a training dataset in the context of this document.

Dataset preparation programming for generating training datasets for machine learning models can be executed for processing sparsely labeled video sequences 400. Dataset preparation software programs use labeled cuboids 406 and centers 408 in keyframes 410, 412 to perform linear interpolation to determine positions and orientations for objects 404 in the video frames 402 in between keyframes 410, 412. The identities for the determined positions and orientations for intermediate video frames 402 are determined by identities from keyframes 410, 412.

Figure 6:
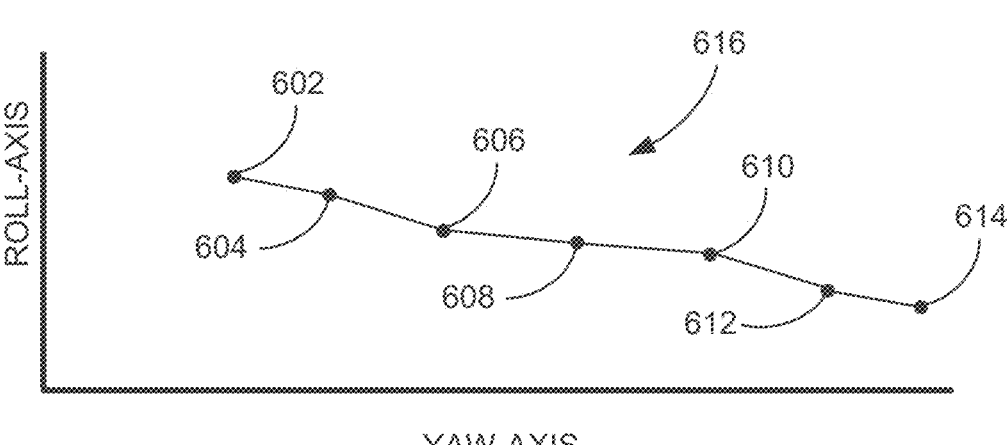
FIG. 6 is a diagram of example two-dimensional rotation data.
Figure 7:
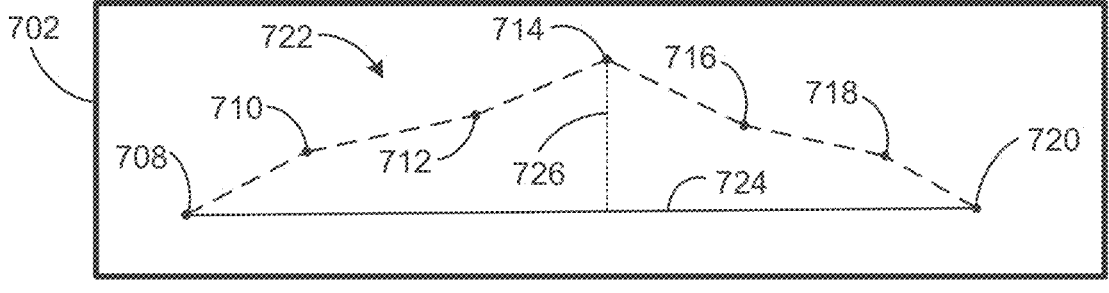
FIG. 7 is a diagram of an example Douglas-Peuker polyline processing.
Figure 7:
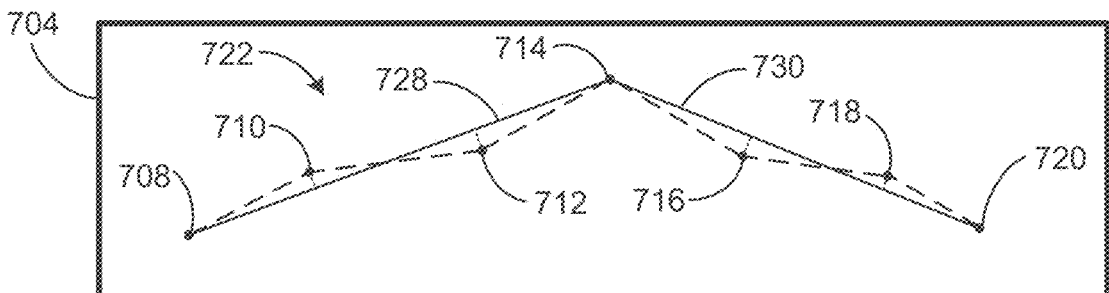
Figure 7:
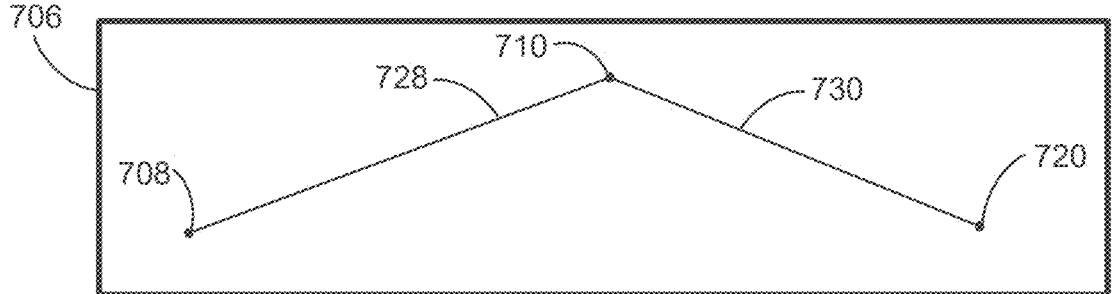

Because densely labeled video sequences 300 include labeled cuboids 306 and centers 308 for objects 304 in each video frame, when the dataset preparation software program attempts to interpolate object positions and orientations between keyframes 310, 312, errors can be introduced between interpolated values and measured values from labeled cuboids 306 included in the densely labeled video sequences 300. Computer resources can be used inefficiently in computing linear interpolation values when they are not needed and then checking and possibly correcting the linearly interpolated values. Techniques described herein for generating sparsely labeled video sequences 400 from densely labeled video sequences 300 can enhance generation of training datasets, and can enhance efficiency of computing interpolation values, for training machine learning models by removing labeled cuboids 306 and centers 308 from intermediate frames 302 of densely labeled video sequences 300 while determining that the positions and orientations of objects included in the intermediate video frames 402 have a linear relationship. When the position and orientation of an object 304 included in intermediate video frames 302 is determined to be nonlinear with respect to a user-selected threshold as described in relation to FIG. 8, a new keyframe 410, 412 can be designated to make the relationships between objects 304 in intermediate frames 302 linear. Designating a new keyframe includes adding the appropriate labeled cuboid 306 to the designated frame. Generating sparsely labeled video sequences 400 from densely labeled video sequences 300 as illustrated in FIGS. 5-7 and described in relation to FIG. 8 can enhance training machine learning models by reducing computer resources required to generate training datasets.

Reducing densely labeled video sequences 300 to sparsely labeled video sequences 400 includes determining motion of objects 304 labeled with labeled cuboids 306 in intermediate frames 302 between keyframes 310, 312. For example, a densely labeled video sequence 300 can be acquired by a sensor 116 included in a vehicle 110 and can include images of an object 304, for example a vehicle, as it moves in traffic. The position and orientation of object 304 can be measured in six degrees of freedom in global coordinates. Object 304 positions can be determined in global coordinates as x, y, and z location coordinates with respect to latitude, longitude, and altitude, for example. Object 304 orientations can be determined as roll, pitch, and yaw rotational coordinates can be determined with respect to orthogonal x, y, and z coordinate axes.

Because of scale differences in positional and rotational coordinates, determining linear relationships between successive positions and orientations can best be determined separately. Further, because objects 304 are constrained to operate on a roadway, roll and pitch rotational coordinates do not generally add useful data to the calculations, meaning that object 304 orientations can be determined using only yaw rotations, which are rotations in a plane parallel to the roadway. Object 304 positions and object 304 orientations can be plotted separately to determine linearity as illustrated in FIGS. 5 and 6.

Figure 5:
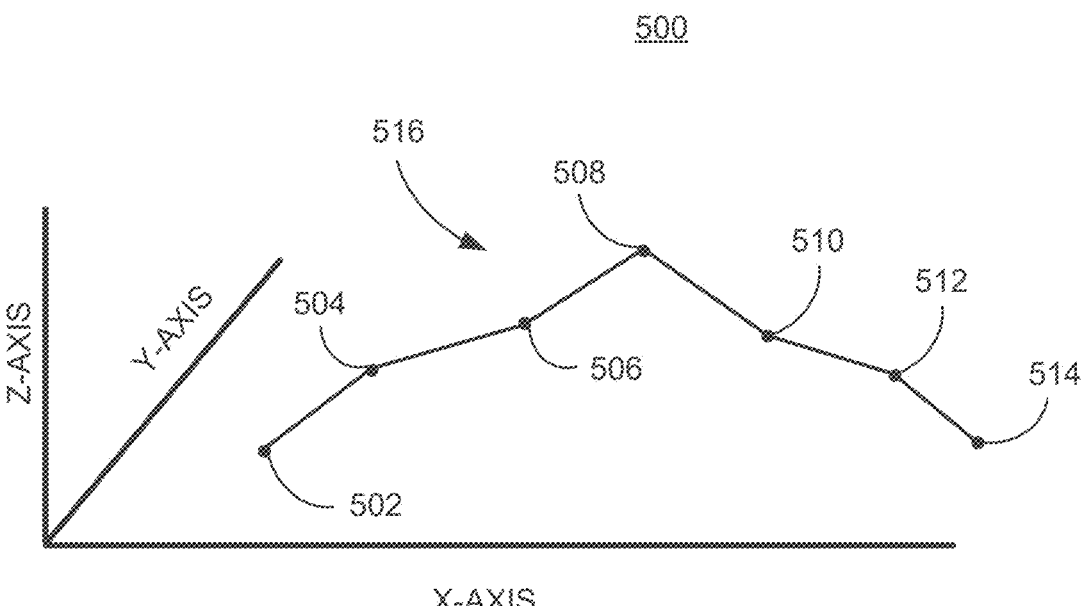
FIG. 5 is a diagram of example three-dimensional position data.

FIG. 5 is a three-dimensional graph 500 of that plots successive positions at data points 502, 504, 506, 508, 510, 512, 514 to form a three-dimensional polyline 516 of successive positions of an object 304 from frames 302 of a densely labeled video sequence 300. Polyline 516 is a three-dimensional line that includes multiple linear line segments. Polyline 516 is plotted on a three-dimensional graph 500 that includes an x-axis, a y-axis, and a z-axis. The x-axis, a y-axis, and a z-axis can plot the successive positions of the object 304 in x, y, z global coordinates as it moves with respect to a sensor acquiring the data. For example, if the object 304 did not move with respect to the sensor, the polyline 516 would be a single point. Graph 500 can indicate a vehicle moving in one direction with respect to a sensor at positions indicated by data points 502, 504, 506, 508 and then turning to move in a different direction a positions indicated by data points 508, 510, 512, 514. The techniques described herein for polyline 516 reduction determine when a polyline 516 that indicates motion of an object 304 between keyframes 310, 312 is linear within a user-selected tolerance. When the polyline 516 is determined to be nonlinear an intermediate frame can be designated as a new keyframe to make subsets of the polyline 516 linear between keyframes.

FIG. 6 is a two-dimensional graph 600 that plots successive orientations 602, 604, 606, 608, 610, 612, 614, to form a two-dimensional polyline 616 of object 304 orientations in successive frames 302 from a densely labeled video sequence 300. The two-dimensional polyline 616 is plotted on a two-dimensional graph 600 that includes yaw on the y-axis and evenly spaced frames on the x-axis. The yaw axis and the frame axis plot polyline 616 of an object 304 with respect to a sensor. If object 304 did not change orientation with respect to a sensor, the polyline 616 would be a straight line in the two-dimensional graph 600. Polyline 616 can indicate an object 304 turning with respect to a sensor, for example. As will be discussed in relation to FIG. 7, below, distances between orientations 602, 604, 606, 608. 610. 612. 614 can be determined more than two dimensions based on the type of distance measure employed.

FIG. 7 is three two-dimensional graphs 702, 704, 706 that illustrate a Douglas-Peucker algorithm used to determine linear segments of a polyline 722 illustrated by a dashed line. The Douglas-Peucker algorithm is described in "Algorithms for the Reduction of the Number of Points Required to Represent a Digitized Line or Its Caricature", David H. Douglas, and Thomas K. Peucker, THE CANADIAN CARTOGRAPHER, Vol. 10, No. 2, December 1973, pp 112-122. Polyline 722 is formed from linear segments between keyframe points 708, 720 and includes points 708, 710, 712, 714, 716, 718, 720. The polyline 722 can indicate three-dimensional positions or two-dimensional orientations, for example. A Douglas-Peuker algorithm is an iterative endpoint fit algorithm that simplifies a polyline 722 by eliminating points that are determined to lie within a user-selected threshold value of linear segments.

A Douglas-Peucker algorithm begins in graph 702 by drawing a straight line 724 between end points 708, 720 each from a keyframe. The Douglas-Peucker algorithm then finds the point 714 that is the greatest perpendicular distance 726 (dotted line) from the straight line 724. In graph 704, perpendicular distance 726 is determined to be greater than a maximum allowable distance based on an error term ε. Error term ε can be determined by selecting the maximum permissible error in a location of a labeled cuboid 306 in the data input to the training preparation software. The location of the straight line 724 will be input to the training dataset as the initial estimate for the location of the object 304 at a given frame 302. The Douglas-Peucker algorithm then draws a straight line 728 from the starting point 708 to the point 714 determined to be outside the threshold from line 724. Perpendicular distances indicated by dotted lines between points 710, 712 and straight line 728 are determined to be less that the threshold. A straight line 730 is drawn from point 714 to an end point 720 in a second keyframe. Perpendicular distances indicated by dotted lines between points 716, 718 and line 730 are determined to be less than the threshold.

In graph 706, the data point 710, 712 and data points 716, 718 that are determined to be closer to lines 28 and 730 respectively are eliminated, leaving start point 708, point 710, end point 720 and straight line segments 728, 730. To make line segments between keyframes linear, the reduction algorithm that reduces densely labeled video sequences 300 to sparsely labeled video sequences 400 can designate a new keyframe in the frame that includes data point 710 along with the labeled cuboid that includes data point 710. In this fashion, the reduction algorithm can be implemented in the programming that prepares training datasets for training machine learning models with a sparsely labeled video sequence 300 that includes linear line segments from labeled keyframe to labeled keyframe, within a user-selected threshold.

The reduction algorithm that generates sparsely labeled video segments 400 from densely labeled video segments 300 can determine new keyframes for both positions and orientations of an object 304. If either positions or orientations indicate a new keyframe is required to maintain linear object 304 data between keyframes, a keyframe can be designated and a labeled cuboid 306 inserted in the keyframe.

Perpendicular distances between a data point 502, 504, 506, 508, 510, 512, 514 and a line 724, 728, 730 can be measured using different techniques depending upon the type of data being measured. For three-dimensional position data, an L2 norm is used. An L2 norm, also called Euclidian distance, measures a perpendicular distance $PD_p$ by determining the square root of a sum of square x, y, and z distances, where the x, y, and z distances are the minimum distances from a data point 502, 504, 506, 508, 510, 512, 514 to a three-dimensional line 724, 728, 730 calculated by the equation:

$$PD_p = \sqrt{x^2 + y^2 + z^2} \qquad (1)$$

Perpendicular distances between a two-dimensional orientation data point 602, 604, 606, 608, 610, 612, 614 and a two-dimensional line 724, 728, 730 can be measured by three different techniques. Changes in orientation affect the location and direction of objects differently than changes in position. Because the differences in scale between changes in position and changes in orientation, differences in position and orientation are measured separately.

A first technique for measuring distances for orientation data points 602, 604, 606, 608, 610, 612, 614 assumes that the orientation data points 602, 604, 606, 608, 610, 612, 614 include yaw while roll and pitch are held constant. A first perpendicular distance $PD_1$ for yaw can be measured using linear interpolation in quaternion space with subsequent renormalization. A quaternion is a four element tensor of the form a+bi+cj+dk where a, b, c, and d are scalars and i, j, and k can be orthogonal basis vectors corresponding to roll, pitch, and yaw rotations. In this example a=0, b=c=1, and d=yaw. The interpolation can be performed on a 4D sphere, where the distance $PD_1$ between rotations can be the distance between unit quaternions as measured from orientation data points 602, 604, 606, 608, 610, 612, 614 and lines 724, 728, 730 in three or more dimensions.

A second technique for measuring distances between orientation data point 602, 604, 606, 608, 610, 612, 614 and a line 724, 728, 730 measures exponential mapping of the Lie Group formed by yaw. In this applications, a distance $PD_2$ between yaw and a line can be determined by a Lie algebra bracket operation [yaw, line] between a yaw value and straight line 724, 728, 730. The Lie Algebra bracket operation [yaw, line] can be determined as an L2 distance between corresponding Lie Algebra vectors for yaw and a line 724, 728, 730 in three or more dimensions.

A third technique for measuring distances for orientation data points 602, 604, 606, 608, 610, 612, 614 and a line 724, 728, 730 measures L2 distance in rotation matrices. The distance can be measured as a distance between rotated and original x, y, and z unit vectors. Rotation $R_{yaw}$ about the x, y, and z axes for yaw y can be determined in three or more dimensions by a rotation matrix determined by the equation:

$$R_{yaw} = \begin{bmatrix} \cos y & -\sin y & 0 \\ \sin y & \cos y & 0 \\ 0 & 0 & 1 \end{bmatrix} \qquad (2)$$

Figure 8:
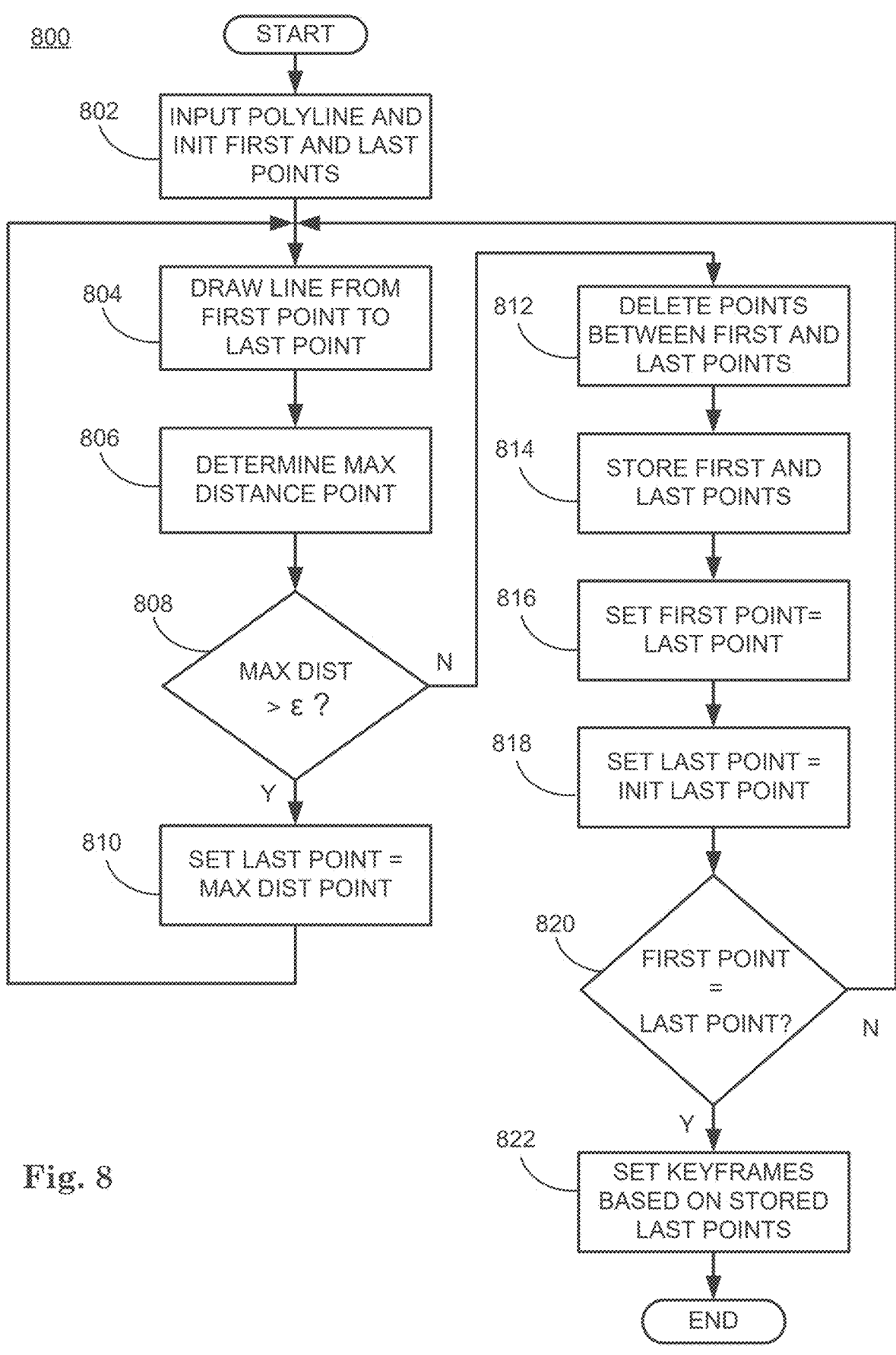
FIG. 8 is a flowchart diagram of an example Douglas-Peuker process.

FIG. 8 is a flowchart of a process 800 for reducing a densely labeled video sequence 300 to a sparsely labeled video sequence 400 using a Douglas-Peucker algorithm executing on a server computer 120. The sparsely labeled video sequence 400 can be received by a preparation software program executing on server computer 120 to be stored as a training dataset for training a machine learning model. The machine learning model can be trained on server computer 120. Following training, the machine learning model can be downloaded to a computing device 115 included in a vehicle 110 to operate the vehicle 110. Process 800 includes multiple blocks that can be executed in the illustrated order. Process 800 could alternatively or additionally include fewer blocks and can include the blocks executed in different orders.

Process 800 begins in block 802, where server computer 120 inputs a polyline 722 indicating three-dimensional locations or two-dimensional orientations from a densely labeled video sequence 300. A first point 708 is set to the position or orientation of a point from a first or start keyframe and a last point 720 is set to the position or orientation of a point from a second or end keyframe.

At block 804 server computer 120 draws a straight line 724 from the first point 708 to the last point 720 as described in relation to FIG. 7, above.

At block 806 server computer 120 determines the maximum perpendicular distance from straight line 724 to a point on the polyline 722 as described in relation to FIG. 7, above.

At block 808 server computer 120 compares the maximum perpendicular distance to the error ε as described above in relation to FIG. 7. When the maximum perpendicular distance is greater than the error ε, process 800 passes to block 810. When the maximum perpendicular distance is less than error ε, process 800 passes to block 812.

At block 810 server computer 120 sets the last point equal to the point having the maximum perpendicular distance and process 800 returns to block 804 to draw a new straight line 728, 730 and test the new straight line 728, 730 against error ε.

At block 812 no points with are included with a maximum perpendicular distance from the straight line 724, 728, 730 greater than error ε. Server computer 120 deletes all data points between first point and last point and retrains the straight line 724, 728, 730 between first point and last point.

At block 814 server computer 120 stores the first point and the last point that define straight line 724, 728, 730.

At block 816 server computer 120 sets the first point equal to the last point to move the start of the straight line to the next section of the polyline 722.

At block 818 server computer 120 resets the last point to the initial last point from block 802 to reset the straight line to the next section of the polyline 722 that ends at the second keyframe.

At block 820 server computer 120 tests to see if the first point is the same as the last point. If the first point and the last point are not the same point, process 800 returns to block 804 to draw a new straight line and look for a maximum perpendicular distance. If the first point and the last point are the same point, process 800 passes to block 822.

At block 822 server computer 120 recalls stored first and last points to determine if a one or more new keyframes can be designated based on data points that exceed the maximum perpendicular distance error ε. Following block 822 process 800 ends.

Figure 9:
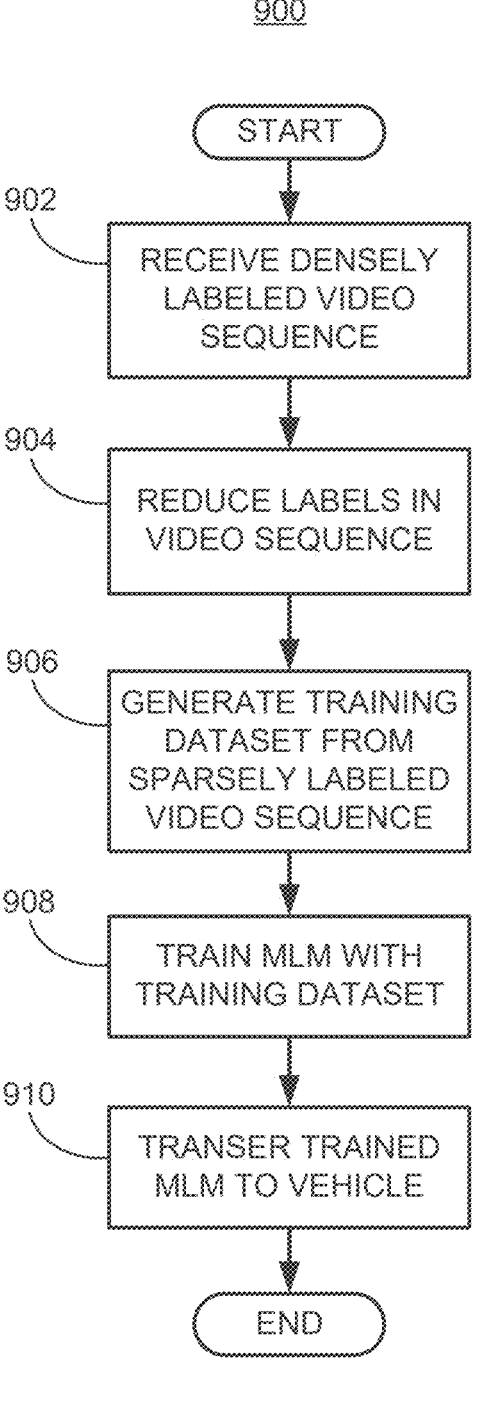
FIG. 9 is a flowchart diagram of an example process to generate a sparsely labeled training dataset for training a machine learning model.

FIG. 9 is a flowchart of a process 900 for generating a sparsely labeled video sequence for training a machine learning model, training the machine learning model and transferring the trained machine learning model to a vehicle 110. Process 900 can be implemented in a server computer 120, for example. Process 900 includes multiple blocks that can be executed in the illustrated order. Process 900 could alternatively or additionally include fewer blocks, and can include the blocks executed in different orders.

Process 900 begins at block 902, where a server computer 120 receives a densely labeled video sequence as discussed above in relation to FIG. 3, above.

At block 904 server computer 120 reduces the densely labeled video sequence to a sparsely labeled video sequence using a Douglass-Peucker algorithm as described in relation to FIGS. 7 and 8, above.

At block 906 a training data preparation software program executing on server computer 120 receives the sparsely labeled video sequence and prepares a training dataset for training a machine learning model.

At block 908 server computer 120 trains a machine learning model based on a training dataset generated based on the sparsely labeled video sequence.

At block 910 server computer 120 can transmit the trained machine learning model to a computing device 115 in a vehicle 110, where the machine learning model can operate the vehicle 110. Following block 910 process 900 ends.

Any action taken by a vehicle or user of the vehicle in response to one or more navigation prompts disclosed herein should comply with all rules specific to the location and operation of the vehicle (e.g., Federal, state, country, city, etc.). More so, any navigation prompts disclosed herein are for illustrative purposes only. Certain navigation prompts may be modified and omitted depending on the context, situation, and applicable rules. Further, regardless of the navigation prompts, users should use good judgement and common sense when operating the vehicle. That is, all navigation prompts, whether standard or "enhanced," should be treated as suggestions and only followed when in compliance with any rules specific to the location and operation of the vehicle.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
   a computer that includes a processor and a memory, the memory including instructions executable by the processor to:
   plot three-dimensional positions of labeled cuboids from successive frames between a first keyframe and a second keyframe of a densely labeled video sequence;
   generate a sparsely labeled video sequence by removing the labeled cuboids from the densely labeled video sequence with positions that are within a user-selected distance from a three-dimensional line extending from a position of the labeled cuboid in the first keyframe to a position of the labeled cuboid in the second keyframe; and output the sparsely labeled video sequence for training a machine learning system.

2. The system of claim 1, the instructions including further instruction to:

plot orientations of the labeled cuboids from the successive frames between the first keyframe and the second keyframe of the densely labeled video sequence; and generate the sparsely labeled video sequence by removing the labeled cuboids from the densely labeled video sequence with orientations that are within the user-selected distance from a line extending from the orientation of the labeled cuboid in the first keyframe to the orientation of the labeled cuboid in the second keyframe.

3. The system of claim 1, wherein the labeled cuboids are three-sided wire frames that indicate objects.

4. The system of claim 3, wherein the labeled cuboids include labels that identify the objects.

5. The system of claim 1, wherein the three-dimensional positions of the labeled cuboids are x, y, and z global coordinates.

6. The system of claim 1, the instructions including further instructions to remove the labeled cuboids from the densely labeled video sequence by a Douglas-Peucker algorithm that removes the labeled cuboids by determining L2 distances between a three-dimensional polyline based on the positions of the labeled cuboids and the three-dimensional line extending from the position of the labeled cuboid in the first keyframe to the position of the labeled cuboid in the second keyframe.

7. The system of claim 6, wherein, when the L2 distance exceeds a maximum allowable L2 distance, a new keyframe is indicated in the video sequence.

8. The system of claim 2, the instructions including further instructions to remove the labeled cuboids from the densely labeled video sequence by a Douglas-Peucker algorithm that removes the labeled cuboids by determining distances by linear interpolation in quaternion space between a polyline based on the orientations of the labeled cuboids and the line extending from the orientation of the labeled cuboid in the first keyframe to the orientation of the labeled cuboid in the second keyframe.

9. The system of claim 8, wherein, when the distance exceeds a maximum allowable distance, a new keyframe is indicated in the video sequence.

10. The system of claim 8, wherein the Douglas-Peucker algorithm removes the labeled cuboids by determining distances between the polyline and the line extending from the orientation of the labeled cuboid in the first keyframe to the orientation of the labeled cuboid in the second keyframe based on L2 distances between Lie Algebra vectors for the line and the orientations of the labeled cuboids.

11. The system of claim 8, wherein the Douglas-Peucker algorithm removes the labeled cuboids by determining L2 distances in rotation matrices between the line and the orientations of the labeled cuboids.

12. The system of claim 1, wherein the machine learning system is a neural network.

13. A method, comprising:

plotting three-dimensional positions of labeled cuboids from successive frames between a first keyframe and a second keyframe of a densely labeled video sequence;

generating a sparsely labeled video sequence by removing the labeled cuboids from the densely labeled video sequence with positions that are within a user-selected distance from a three-dimensional line extending from a position of the labeled cuboid in the first keyframe to a position of the labeled cuboid in the second keyframe; and outputting the sparsely labeled video sequence for training a machine learning system.

14. The method of claim 13, further comprising:

plotting orientations of the labeled cuboids from the successive frames between the first keyframe and the second keyframe of the densely labeled video sequence; and generating the sparsely labeled video sequence by removing labeled cuboids from the densely labeled video sequence with orientations that are within the user-selected distance from a line extending from the orientation of the labeled cuboid in the first keyframe to the orientation of the labeled cuboid in the second keyframe.

15. The method of claim 13, wherein the labeled cuboids are three-sided wire frames that indicate objects.

16. The method of claim 15, wherein the labeled cuboids include labels that identify the objects.

17. The method of claim 13, wherein the three-dimensional positions of the labeled cuboids are x, y, and z global coordinates.

18. The method of claim 13, further comprising removing the labeled cuboids from the densely labeled video sequence by a Douglas-Peucker algorithm that removes the labeled cuboids by determining L2 distances between a three-dimensional polyline based on the positions of the labeled cuboids and the three-dimensional line extending from the position of the labeled cuboid in the first keyframe to the position of the labeled cuboid in the second keyframe.

19. The method of claim 18, wherein, when the L2 distance exceeds a maximum allowable L2 distance, a new keyframe is indicated in the video sequence.

20. The method of claim 14, further comprising removing the labeled cuboids from the densely labeled video sequence by a Douglas-Peucker algorithm that removes the labeled cuboids by determining a distances by linear interpolation in quaternion space between a polyline based on the orientations of the labeled cuboids and the line extending from the orientation of the labeled cuboid in the first keyframe to the orientation of the labeled cuboid in the second keyframe.

* * * * *